United States Patent
Bailey et al.

(10) Patent No.: US 10,952,124 B1
(45) Date of Patent: Mar. 16, 2021

(54) LIMITING CONNECTION REQUESTS FROM WIRELESS DEVICES

(71) Applicant: Sprint Spectrum LP, Overland Park, KS (US)

(72) Inventors: Christopher Bailey, Overland Park, KS (US); Sean Leary, Olathe, KS (US); Steve Walsh, Olathe, KS (US); Ryan Patrick Dreiling, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 65 days.

(21) Appl. No.: 16/044,896

(22) Filed: Jul. 25, 2018

(51) Int. Cl.
*H04W 48/06* (2009.01)
*H04W 52/02* (2009.01)
*H04W 8/24* (2009.01)
*H04W 48/12* (2009.01)
*H04W 60/00* (2009.01)

(52) U.S. Cl.
CPC ............ *H04W 48/06* (2013.01); *H04W 8/24* (2013.01); *H04W 48/12* (2013.01); *H04W 52/0212* (2013.01); *H04W 52/0235* (2013.01); *H04W 60/00* (2013.01)

(58) Field of Classification Search
CPC ... H04W 48/06; H04W 52/0235; H04W 8/24; H04W 52/0212; H04W 48/12; H04W 60/00
See application file for complete search history.

(56) References Cited

U.S. PATENT DOCUMENTS

| | | | |
|---|---|---|---|
| 9,019,068 B2 | 4/2015 | Varoglu | |
| 9,432,310 B1* | 8/2016 | Shusterman | H04L 41/0659 |
| 2004/0121775 A1* | 6/2004 | Ropolyi | H04W 24/00 455/445 |
| 2004/0243711 A1* | 12/2004 | Rajaniemi | H04L 65/1016 709/227 |
| 2006/0140385 A1* | 6/2006 | Haase | H04L 65/1006 379/221.09 |
| 2009/0061863 A1* | 3/2009 | Huggett | H04W 12/08 455/434 |
| 2009/0093249 A1* | 4/2009 | Zhu | H04L 65/1073 455/433 |
| 2011/0217978 A1* | 9/2011 | Horn | H04W 8/186 455/433 |
| 2012/0135713 A1* | 5/2012 | Lee | H04W 8/02 455/411 |
| 2012/0178449 A1* | 7/2012 | Liao | H04W 60/00 455/435.2 |
| 2012/0257571 A1* | 10/2012 | Liao | H04W 4/70 370/328 |
| 2012/0275312 A1* | 11/2012 | Cormier | H04W 8/183 370/241 |
| 2014/0018042 A1* | 1/2014 | Yang | H04W 36/30 455/411 |
| 2014/0198637 A1* | 7/2014 | Shan | H04W 52/244 370/229 |

(Continued)

*Primary Examiner* — Tejis Daya

(57) ABSTRACT

Systems, methods, and processing nodes for limiting connection requests from wireless devices instruct certain wireless devices to stop sending connection requests or to turn off a radio of the wireless devices, based on a determination that the wireless device is not authorized to access the wireless network. Thus, resource consumption associated with signaling overhead is minimized.

12 Claims, 5 Drawing Sheets

(56) References Cited

U.S. PATENT DOCUMENTS

| | | | |
|---|---|---|---|
| 2014/0355417 A1* | 12/2014 | Kim | H04L 41/0654 |
| | | | 370/221 |
| 2015/0043353 A1* | 2/2015 | Javed | H04W 24/08 |
| | | | 370/241 |
| 2015/0245256 A1* | 8/2015 | Kiss | H04W 12/06 |
| | | | 455/436 |
| 2016/0183175 A1* | 6/2016 | Keller | H04W 8/02 |
| | | | 370/328 |
| 2016/0192251 A1* | 6/2016 | Chebolu | H04W 76/18 |
| | | | 455/404.1 |
| 2016/0249248 A1* | 8/2016 | Ronneke | H04W 12/0802 |
| 2016/0277961 A1* | 9/2016 | Hedman | H04W 4/70 |
| 2017/0127285 A1* | 5/2017 | Nair | H04W 8/02 |
| 2018/0098264 A1* | 4/2018 | Zait | H04M 17/10 |
| 2018/0098624 A1* | 4/2018 | Corless | A47B 88/43 |
| 2018/0368094 A1* | 12/2018 | Deaconu | H04W 8/18 |
| 2019/0037476 A1* | 1/2019 | Zait | H04W 8/06 |
| 2019/0116529 A1* | 4/2019 | Lu | H04W 8/26 |

\* cited by examiner

US 10,952,124 B1

LIMITING CONNECTION REQUESTS FROM WIRELESS DEVICES

TECHNICAL BACKGROUND

Wireless devices are increasingly used for applications other than telephone calls. For example, today's smartphones are used as computing devices and web interfaces, connecting to Wi-Fi networks and utilizing services such as VoIP, etc. Such functionality may be enabled by various radios on the wireless device, which typically include a cellular radio, a data radio, a Wi-Fi radio, and a BLUETOOTH radio, among others. However, most wireless devices are primarily programmed as cellular phones, in that they periodically or repeatedly attempt to connect to cellular networks via their cellular radios. For wireless devices that are not registered with a cellular network, or for wireless devices intended on being used as computing devices connected over Wi-Fi or other networks, these connection attempts can cause unnecessary network traffic across the wireless network as they would be denied. The battery life of wireless devices is wasted in such repeated attempts. Further, a user wishing to avoid connecting to cellular networks must manually turn off a wireless device cellular radio to avoid wasting network and power resources.

OVERVIEW

Exemplary embodiments described herein include systems, methods, and processing nodes for limiting connection requests from wireless devices by instructing certain wireless devices to stop sending connection requests or to turn off a radio of the wireless devices. Thus, resource consumption associated with signaling overhead is minimized.

An exemplary system described herein for limiting connection requests from a wireless device comprises a processing node and a processor coupled to the processing node. The processor enables the processing node to perform operations including receiving a first connection request from a wireless device, the first connection request for requesting a connection to a wireless network, determining that the wireless device is not authorized to access the wireless network, and disabling subsequent connection requests from the wireless device.

An exemplary method for limiting connection requests from a wireless device includes receiving a first connection request from the wireless device, the first connection request for requesting a connection to a wireless network and comprising a first identifier associated with the wireless device, determining that the first identifier is not registered with the wireless network, and transmitting a unique code to the wireless device. The unique code for instructing the wireless device to stop transmitting connection requests to the processing node.

An exemplary processing node for limiting connection requests from a wireless device is configured to perform operations including receiving a first connection request from the wireless device, communicating with a subscriber server coupled to the processing node for determining that the wireless device is not registered with the subscriber server, and transmitting an instruction to the wireless device to stop transmitting connection requests to the processing node.

DETAILED DESCRIPTION

Figure 1:
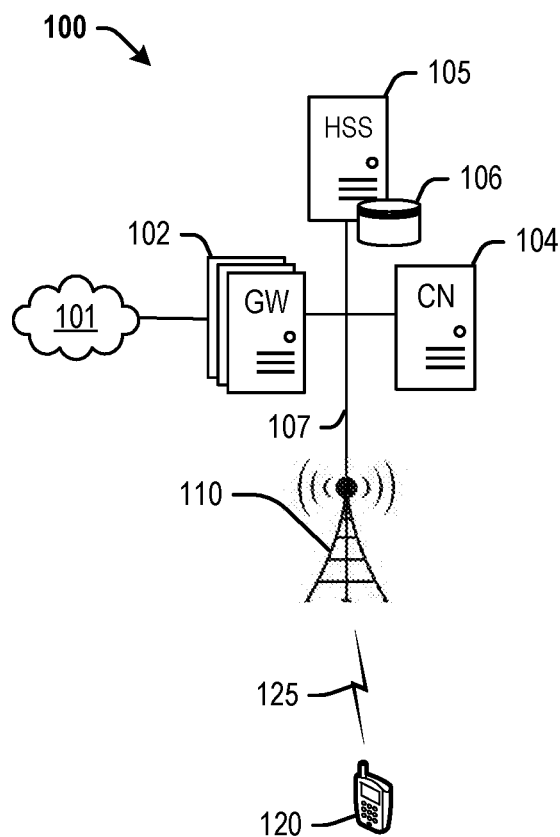
FIG. 1 depicts an exemplary system for limiting connection requests from a wireless device.

Exemplary embodiments described herein include systems, methods, and processing nodes for limiting connection requests from a wireless device. For example, a system for limiting connection requests from a wireless device includes at least a processing node and a processor coupled to the processing node. The processing node may be part of a controller node, such as a mobility management entity (MME), further described below. The controller node may be communicatively coupled to an access node that provides a radio air interface to which a wireless device can attach. Thus, the wireless device communicates with the controller node via the access node, as further described below.

When the wireless device is turned on or resume from an idle state, it may transmit a connection request, such as an attach request to one or more access nodes with which is can communicate via, for example, a radio air interface. The connection request may include at least an identifier associated with the wireless device, such as an international mobile subscriber identity (IMSI), or international mobile equipment identity (IMEI). The connection request may also include an identifier associated with one or more controller nodes. For example, the wireless device may remember and/or attempt to connect to a last-connected controller node. Thus, the access node forwards the connection request to said controller node. If no controller node is identified in the attach request, the access node may transmit the connection request to a default controller node. Transmitting the request to the controller node enables the access node to authenticate the wireless device prior to providing the wireless device with network access.

Upon receiving the connection request from the wireless device via the access node, the controller node attempts to determine whether or not the wireless device is authorized to access the wireless network. The controller node may perform this operation by referring to a locally-stored database or, in some embodiments, by transmitting the first identifier to a subscriber server communicably coupled to the controller node. For example, in some wireless networks, a home subscriber server (HSS) stores subscriber information and enables authentication of subscribers that are currently registered with the wireless network. In these wireless networks, controller node (e.g. an MME) communicates with the HSS to verify or authenticate mobile subscribers, prior to enabling network services for said mobile subscribers. For example, the MME transmits the IMEI or IMSI of the wireless device to the HSS, and the HSS compares the IMEI or IMSI with a local database to determine whether or not the wireless device is registered with the wireless network. If the HSS does not recognize the IMEI or IMSI, the HSS transmits a notification to the MME that the wireless device is not registered with the wireless network, or an equivalent message that indicates to the MME that the wireless device is not registered or authorized to access the wireless network. The wireless device may have not yet registered with the wireless network, or may have previously registered with the wireless network but the registration may have expired or lapsed.

Upon determining that the wireless device is not authorized to access the wireless network, the controller node attempts to disable subsequent connection requests from the wireless device. Disabling subsequent connection requests from the wireless device may be achieved by transmitting an instruction to the wireless device. For example, the instruction may comprise a unique code, such as an evolved packet system mobility management (EMM) code. Although EMM codes generally exist in the current state of the art, the commands within these existing codes are temporary, and do not include an instruction to a wireless device to cease transmission of connection requests, nor do they include an instruction to a wireless device to disable a radio. Further, existing EMM codes are temporary commands that do not cause a wireless device to change its behavior. Thus, exemplary embodiments described herein utilize a new EMM code. In one exemplary embodiment, the new EMM code may comprise an instruction to stop transmitting connection requests to the controller node. In another exemplary embodiment, the new EMM code may comprise an instruction to disable a radio of the wireless device. Upon receiving the EMM code, the wireless device may perform one or both of these actions (i.e. ceasing transmission of connection requests or disabling a radio). Further, the EMM code (or any other instruction) may instruct the wireless device to stop transmitting connection requests or to disable a radio for a specified time period, or to permanently stop transmitting connection requests to the specific controller node, access node, and combinations thereof.

In addition to the systems and methods described herein, these operations may be implemented as computer-readable instructions or methods, and processing nodes on the network for executing the instructions or methods. For example, a processing node coupled to a mobility management entity (MME) or any other network node may be configured to perform the operations described herein. These and other embodiments are further described with reference to FIGS. 1-5 below.

FIG. 1 depicts an exemplary system 100 for limiting connection requests from a wireless device in a wireless network. System 100 comprises a communication network 101, gateway node(s) 102, controller node 104, subscriber server 105, access node 110, and wireless device 120. In other embodiments, any other combination of access nodes and wireless devices may be evident to those having ordinary skill in the art in light of this disclosure. In this exemplary embodiment, access node 110 may be a macro-cell access node configured to deploy a wireless air-interface wireless device 120 can attach, and send and receive data via communication link 125. The data may be sent to and received from any network node such as, for example, a network node on network 101.

In operation, when wireless device 120 is turned on or resume from an idle state, it may transmit a connection request, such as an attach request to access node 110 via wireless communication link 125. The connection request may include at least an identifier associated with wireless device 120, such as an international mobile subscriber identity (IMSI), or international mobile equipment identity (IMEI). The connection request may also include an identifier associated with one or more controller nodes, such as controller node 104. For example, wireless device 120 may remember and/or attempt to connect to a last-connected controller node. Thus, access node 110 forwards the connection request to controller node 104. If no controller node is identified in the attach request, access node 110 may transmit the connection request to a default controller node, which in this embodiment is controller node 104. Transmitting the request to controller node 104 enables access node 110 to authenticate the wireless device prior to providing the wireless device with access to network 101 (via, for example, gateways 102 as further described herein).

Upon receiving the connection request from wireless device 120 via access node 110, controller node 104 attempts to determine whether or not wireless device 120 is authorized to access the wireless network. Controller node 104 may perform this operation by referring to a locally-stored database or, in some embodiments, by transmitting the first identifier to a subscriber server 105 communicably coupled to controller node 104. For example, in some wireless networks, a home subscriber server (HSS) stores subscriber information and enables authentication of subscribers that are currently registered with the wireless network. In these wireless networks, controller node 104 (e.g. an MME) communicates with HSS 105 to verify or authenticate mobile subscribers, prior to enabling network services for said mobile subscribers. For example, controller node 104 transmits the IMEI or IMSI of wireless device 120 to HSS 105, and HSS 105 compares the IMEI or IMSI with a local database 106 to determine whether or not wireless device 120 is registered with the wireless network. If HSS 105 does not recognize the IMEI or IMSI, HSS 120 transmits a notification to controller node 104 that wireless device 120 is not registered with the wireless network, or an equivalent message that indicates to controller node 104 that wireless device 120 is not registered or authorized to access the wireless network. Wireless device 120 may have not yet registered with the wireless network, or may have previously registered with the wireless network but the registration may have expired or lapsed.

Upon determining that wireless device 120 is not authorized to access the wireless network, controller node 104 attempts to disable subsequent connection requests from wireless device 120. Disabling subsequent connection requests from wireless device 120 may be achieved by transmitting an instruction to wireless device 120 via, for example, access node 110. For example, the instruction may comprise a unique code, such as an evolved packet system mobility management (EMM) code. Although EMM codes generally exist in the current state of the art, the commands within these existing codes are temporary, and do not include an instruction to a wireless device to cease transmission of connection requests, nor do they include an instruction to a wireless device to disable a radio. Further, existing EMM codes are temporary commands that do not cause a wireless device to change its behavior. Thus, exemplary embodiments described herein utilize a new EMM code. In one exemplary embodiment, the new EMM code may comprise an instruction to wireless device 120 to stop transmitting connection requests to the controller node. In another exemplary embodiment, the new EMM code may comprise an instruction to disable a radio of wireless device 120. Upon receiving the EMM code, wireless device 120 may perform one or both of these actions (i.e. ceasing transmission of connection requests or disabling a radio). Further, the EMM code (or any other instruction) may instruct wireless device 120 to stop transmitting connection requests or to disable a radio for a specified time period, or to permanently stop transmitting connection requests to controller node 104, access node 110, and combinations thereof.

Access node 110 can be any network node configured to provide communication between wireless device 120 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Alternatively, access node 110 may comprise any short range, low power, small-cell access nodes such as a microcell access node, a picocell access node, a femtocell access node, or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102, controller node 104, and subscriber server 105 via communication link 107. Access node 110 may communicate with other access nodes (not shown), using wired or wireless links, such as X2 links. Components of exemplary access nodes are further described with reference to FIG. 3.

Wireless device 120 may be any device, system, combination of devices, or other such communication platform capable of communicating wirelessly with access node 110 using one or more frequency bands deployed therefrom. Wireless device 120 may comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible. In exemplary embodiments described herein, wireless device 120 may be configured to recognize a unique code originating from controller node 104, and interpret the unique code as comprising a command to cease transmissions or disable a radio for an indefinite time period or permanently.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 120. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 107 can use various communication media, such as air, space, metal, optical fiber, or some other signal propagation path—including combinations thereof. Communication link 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication link 107 may include S1 communication links. Other wireless protocols can also be used. Communication link 107 can be a direct link or might include various equipment, intermediate components, systems, and networks. Communication link 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME). One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Subscriber server 105 is any network node coupled with a master user database 106 that supports the network entities that actually handle calls, such as wireless device 120. Subscriber server 105 contains the subscription-related information (subscriber profiles), performs authentication and authorization of the user, and can provide information about the subscriber's location and IP information. Subscriber server 105 can be a standalone computing device, computing system, or network component, and can be accessible, for example, by a wired or wireless connection, or through an indirect connection such as through a computer network or communication network. For example, subscriber server 105 can include a Home Subscriber Server (HSS). One of ordinary skill in the art would recognize that subscriber server 105 is not limited to any specific technology architecture, such as Long Term Evolution (LTE) and can be used with any network architecture and/or protocol.

Subscriber server 105 can comprise a processor and associated circuitry to execute or direct the execution of computer-readable instructions to obtain information. Subscriber server 105 can retrieve and execute software from storage, which can include a disk drive, a flash drive, memory circuitry, or some other memory device, and which can be local or remotely accessible. In an exemplary embodiment, subscriber server 105 includes a database 106 for storing registration information associated with device identifiers of wireless devices such as wireless device 120, and subscriber information of users thereof. As described herein, this information may be requested by or shared with controller node 104 and/or access node 110 via communication link 107, X2 connections, and so on.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: gateway node(s) 102, controller node 104, subscriber server 105, access node 110, and/or network 101.

Figure 2:
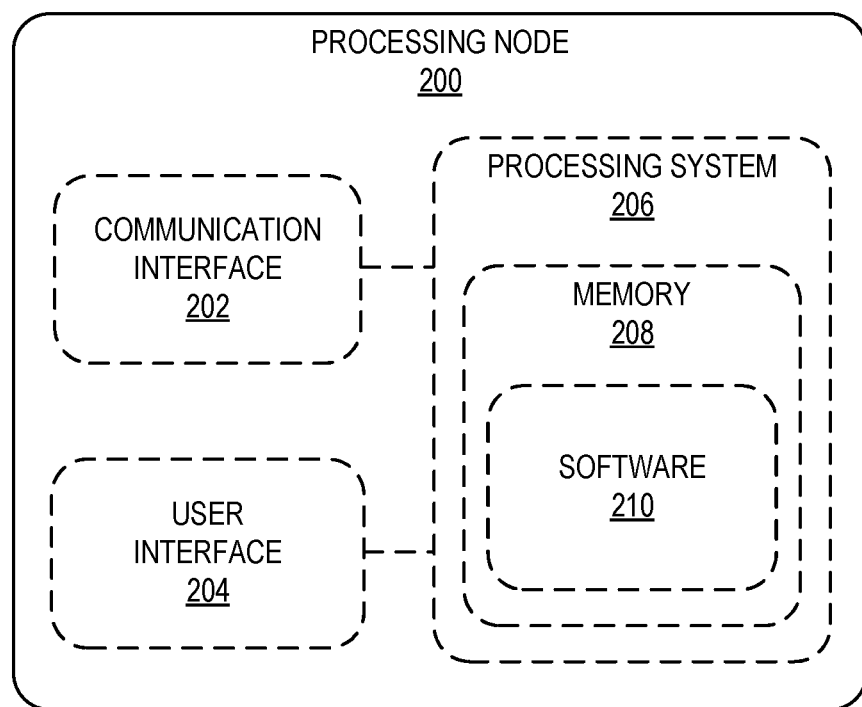
FIG. 2 depicts an exemplary processing node for limiting connection requests from a wireless device.

FIG. 2 depicts an exemplary processing node for limiting connection requests from a wireless device in a wireless network. Processing node 200 comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a module for limiting connection requests from a wireless device, as well as modules for communicating with various network elements such as access nodes and subscriber servers, as described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
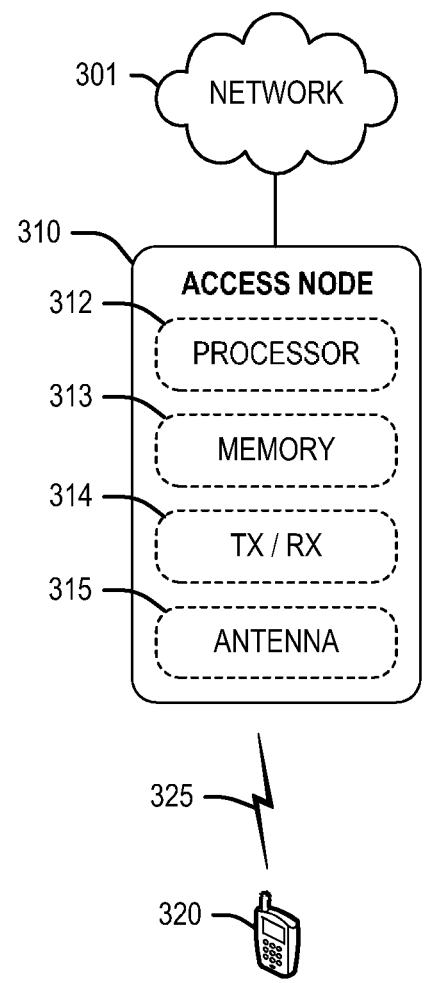
FIG. 3 depicts an exemplary access node for limiting connection requests from a wireless device.

FIG. 3 depicts an exemplary access node 310. Access node 310 may comprise, for example, a macro-cell access node, such as access node 110 described with reference to FIG. 1. Access node 310 is illustrated as comprising a processor 312, memory 313, transceiver 314, and antenna 315. Processor 312 executes instructions stored on memory 313, while transceiver 314 and antenna 315 enable wireless communication with wireless device 320 over wireless communication session 325. Instructions stored on memory 313 can include deploying an air-interface carrier to which wireless device 320 can attach to access network services directly. Access node 310 may further be configured to perform operations described herein, such as forwarding connection requests and/or EMM codes between wireless devices and controller nodes.

Figure 4:
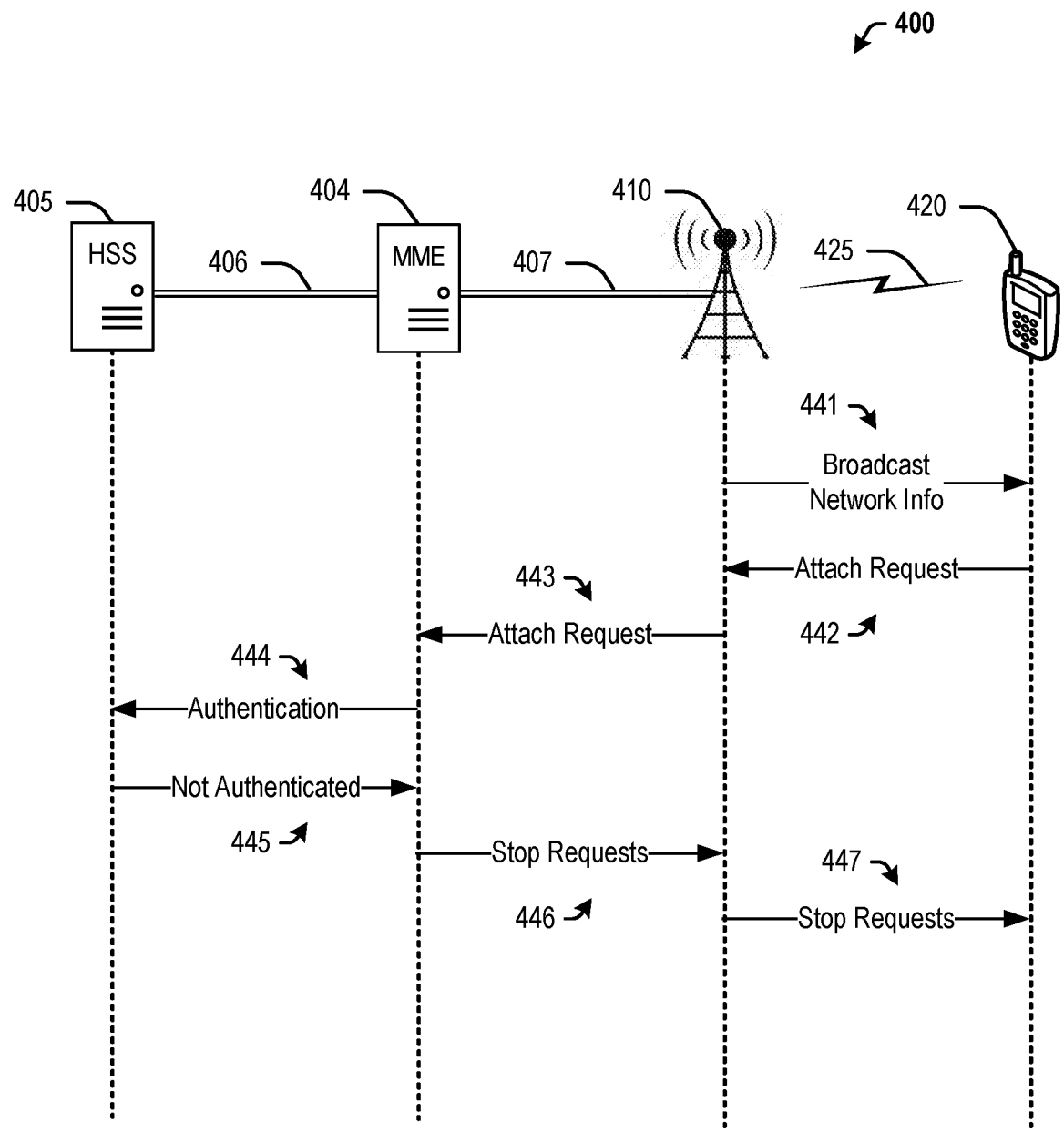
FIG. 4 depicts an exemplary flow diagram for limiting connection requests from a wireless device.

FIG. 4 depicts a network flow diagram for limiting connection requests from a wireless device. The exemplary network flow of FIG. 4 may be implemented using components similar to those depicted in system 100, such as a controller node 404, subscriber server 405, access node 410, and wireless device 420. In this embodiment, communication links 406, 407 may comprise any interface capable of connecting subscriber server 405 to controller node 404, and/or controller node 404 to access node 410, such as S4, S5, S11, S1-MME, or S1-U interfaces. Access node 410 and wireless device 420 communicate with one another via a wireless air-interface 425 using LTE-uu or other wireless interfaces. Although FIG. 4 depicts components arranged (and steps performed) in a particular order for purposes of illustration and discussion, the components and operations discussed herein are not limited to any particular order or arrangement. One skilled in the art, using the disclosures provided herein, will appreciate that various features described herein can be omitted, rearranged, combined, and/or adapted in various ways. For example, although not shown herein, any number of additional components such as gateways, proxy servers, and signaling performed between elements, may be apparent to those having ordinary skill in the art in light of this disclosure.

At 441, access node 410 may broadcast network information to all wireless devices within its range, including wireless device 420. Network information may include, for instance, system information blocks (SIB), master information blocks (MIB), and other information useful for wireless devices attempting connections to a wireless network. Upon receiving this network information broadcast (for instance when wireless device 420 is fired up or resumed from an idle state), wireless device 420 may transmit a connection request at 442, such as an attach request to access node 410. The connection request may include at least an identifier associated with wireless device 420, such as an international mobile subscriber identity (IMSI), or international mobile equipment identity (IMEI). The connection request may also include an identifier associated with one or more controller nodes, such as controller node 404. For example, wireless device 420 may remember and/or attempt to connect to a last-connected controller node. Thus, at 443, access node 410 forwards the connection request to controller node 404. If no controller node is identified in the attach request, access node 410 may transmit the connection request to a default controller node, which in this embodiment is controller node 404. Transmitting the request to controller node 404 enables access node 410 to authenticate the wireless device prior to providing the wireless device with network access.

Upon receiving the connection request from wireless device 420 via access node 410, controller node 404 attempts to determine whether or not wireless device 420 is authorized to access the wireless network. Controller node 404 may perform this operation by transmitting, at 444, the first identifier to a subscriber server 405 communicably coupled to controller node 404 for an authentication procedure. For example, in some wireless networks, a home subscriber server (HSS) stores subscriber information and enables authentication of subscribers that are currently registered with the wireless network. In these wireless networks, controller node 404 communicates with HSS 405 to verify or authenticate mobile subscribers, prior to enabling network services for said mobile subscribers.

If HSS 405 does not recognize the IMEI or IMSI, HSS 420 transmits, at 445, a notification to controller node 404 that wireless device 420 is not authenticated, or an equivalent message that indicates to controller node 404 that wireless device 420 is not registered or authorized to access the wireless network. Wireless device 420 may have not yet registered with the wireless network, or may have previously registered with the wireless network but the registration may have expired or lapsed. Upon determining that wireless device 420 is not authorized to access the wireless network, controller node 404 attempts to disable subsequent connection requests from wireless device 420. Disabling subsequent connection requests from wireless device 420 may be achieved by transmitting, at 446, an instruction to wireless device 420 via access node 410. For example, the instruction may comprise a unique code, such as an evolved packet system mobility management (EMM) code. Although EMM codes generally exist in the current state of the art, the commands within these existing codes are temporary, and do not include an instruction to a wireless device to cease transmission of connection requests, nor do they include an instruction to a wireless device to disable a radio. Further, existing EMM codes are temporary commands that do not cause a wireless device to change its behavior. Thus, exemplary embodiments described herein utilize a new EMM code. In one exemplary embodiment, the new EMM code may comprise an instruction to wireless device 420 to stop transmitting connection requests to the controller node. In another exemplary embodiment, the new EMM code may comprise an instruction to disable a radio of wireless device 420. At 447, upon receiving the EMM code transmitted via access node 410, wireless device 420 may perform one or both of these actions (i.e. ceasing transmission of connection requests or disabling a radio). Further, the EMM code (or any other instruction) may instruct wireless device 420 to stop transmitting connection requests or to disable a radio for a specified time period, or to permanently stop transmitting connection requests to controller node 404, access node 410, and combinations thereof.

Figure 5:
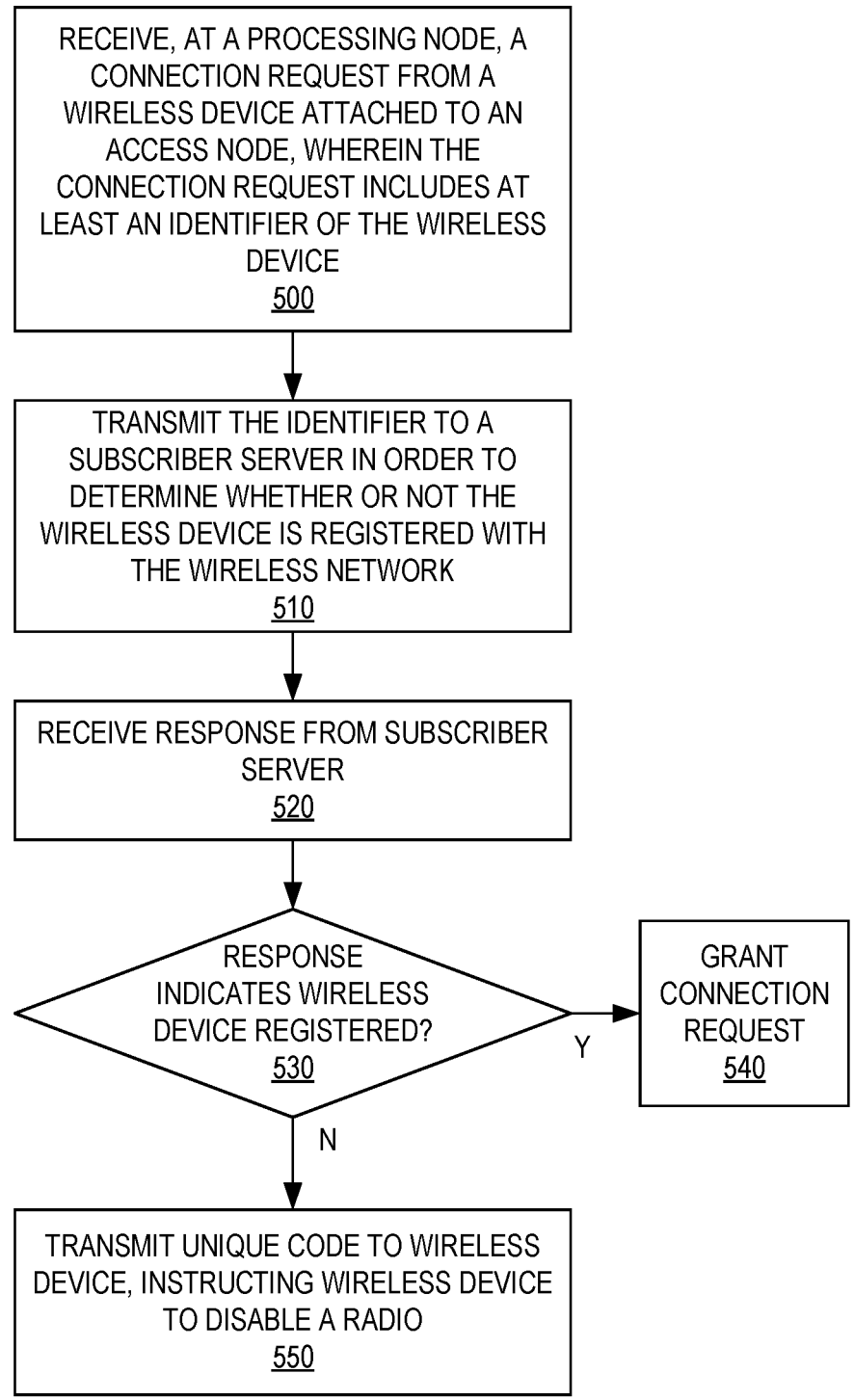
FIG. 5 depicts an exemplary method for limiting connection requests from a wireless device.

FIG. 5 depicts an exemplary method for limiting connection requests from a wireless device in a wireless network. The exemplary method of FIG. 5 may be implemented using components similar to those depicted in system 100, such as access node 110, controller node 104, and/or subscriber server 105. Although FIG. 5 depicts operations performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 500, a controller node receives a connection request from a wireless device. The connection request may be delivered by an access node communicably coupled to the controller node. For example, the access node provides a radio air interface to which a wireless device can attach. Thus, the wireless device communicates with the controller node via the access node. When the wireless device is turned on or resume from an idle state, it may transmit a connection request, such as an attach request to the access node via the radio air interface. Further, the connection request may include at least an identifier associated with the wireless device, such as an international mobile subscriber identity (IMSI), or international mobile equipment identity (IMEI). The connection request may also include an identifier associated with one or more controller nodes. For example, the wireless device may remember and/or attempt to connect to a last-connected controller node. Thus, the access node forwards the connection request to said controller node. If no controller node is identified in the attach request, the access node may transmit the connection request to a default controller node. Transmitting the request to the controller node enables the access node to authenticate the wireless device prior to providing the wireless device with network access.

At 510, upon receiving the connection request from the wireless device via the access node, the controller node attempts to determine whether or not the wireless device is authorized to access the wireless network. The controller node may perform this operation by transmitting the identifier to a subscriber server communicably coupled to the controller node. For example, in some wireless networks, a home subscriber server (HSS) stores subscriber information and enables authentication of subscribers that are currently registered with the wireless network. In these wireless networks, controller node (e.g. an MME) communicates with the HSS to verify or authenticate mobile subscribers, prior to enabling network services for said mobile subscribers. For example, the MME transmits the IMEI or IMSI of the wireless device to the HSS, and the HS S compares the IMEI or IMSI with a local database to determine whether or not the wireless device is registered with the wireless network.

At 520, the controller node receives a response from the subscriber server and, at 530, determines whether or not the wireless device is registered with the network based on the response. For example, if the HSS does not recognize the IMEI or IMSI, the HSS transmits a notification to the MME that the wireless device is not registered with the wireless network, or an equivalent message that indicates to the MME that the wireless device is not registered or authorized to access the wireless network. The wireless device may have not yet registered with the wireless network, or may have previously registered with the wireless network but the registration may have expired or lapsed. Thus, at 550, upon determining that the wireless device is not authorized to access the wireless network, the controller node attempts to disable subsequent connection requests from the wireless device. Disabling subsequent connection requests from the wireless device may be achieved by transmitting an instruction to the wireless device. For example, the instruction may comprise a unique code, such as an evolved packet system mobility management (EMM) code. Although EMM codes generally exist in the current state of the art, the commands within these existing codes are temporary, and do not include an instruction to a wireless device to cease transmission of connection requests, nor do they include an instruction to a wireless device to disable a radio. Further, existing EMM codes are temporary commands that may only cause a wireless device to change its behavior on a temporary basis. Thus, exemplary embodiments described herein utilize a new EMM code. In one exemplary embodiment, the new EMM code may comprise an instruction to disable a radio of the wireless device. Alternatively or in addition, the new EMM code may comprise an instruction to stop transmitting connection requests to the controller node. Upon receiving the EMM code, the wireless device may perform one or both of these actions (i.e. ceasing transmission of connection requests or disabling a radio). Further, the EMM code (or any other instruction) may instruct the wireless device to disable a radio for a specified time period, or to permanently stop transmitting connection requests to the specific controller node, access node, and combinations thereof. Further, at 540, if the wireless device is indeed registered with the wireless network, then the connection request may be granted normally.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for limiting connection requests from a wireless device, the system comprising:
   a processing node; and
   a processor coupled to the processing node, the processor for enabling the processing node to perform operations comprising:
   receiving a first connection request from a wireless device, the first connection request for requesting a connection to a wireless network;
   determining that the wireless device is not authorized to access the wireless network; and
   transmitting a unique evolved packet system mobility management (EMM) code, the unique EMM code comprising an instruction to the wireless device to permanently disable subsequent connection requests from the wireless device,
   wherein permanently disabling subsequent connection requests permanently disables a cellular radio of the wireless device, and
   wherein the wireless device can only utilize a Wi-Fi radio subsequent to permanently disabling the cellular radio.

2. The system of claim 1, the first connection request is received via an access node communicably coupled to the processing node, wherein the wireless device is communicably coupled to the access node.

3. The system of claim 2, wherein the first connection request comprises a first identifier associated with the wireless device.

4. The system of claim 3, wherein the first identifier comprises one or both of an international mobile subscriber identity (IMSI) or an international mobile equipment identity (IMEI).

5. The system of claim 3, wherein determining that the wireless device is not authorized to access the wireless network further comprises transmitting the first identifier to a subscriber server communicably coupled to the processing node, and receiving a notification from the subscriber server that the first identifier is not registered with the wireless network.

6. The system of claim 5, wherein the first identifier was previously registered with the wireless network.

7. The system of claim 5, wherein the subscriber server comprises a home subscriber server (HSS).

8. The system of claim 2, wherein:
   the first connection request further comprises a second identifier associated with a controller node communicably coupled to the processing node, and
   the controller node is further associated with the wireless network to which the wireless device is requesting access.

9. The system of claim 8, wherein the controller node comprises a mobility management server (MME).

10. A method for limiting connection requests from a wireless device, the method comprising:

receiving a first connection request from the wireless device, the first connection request for requesting a connection to a wireless network and comprising a first identifier associated with the wireless device;

determining that the first identifier is not registered with the wireless network; and transmitting a unique evolved packet system mobility management (EMM) code to the wireless device, the unique EMM code for instructing the wireless device to permanently disable subsequent connection requests from the wireless device, wherein permanently disabling subsequent connection requests permanently disables a cellular radio of the wireless device, and wherein the wireless device can only utilize a Wi-Fi radio subsequent to permanently disabling the cellular radio.

11. The method of claim 10, further comprising:

transmitting the first identifier to a subscriber server; and receiving a notification from the subscriber server that the first identifier is not registered with the wireless network.

12. A processing node for limiting connection requests from a wireless device, the processing node comprising a processor, the processor being configured to perform operations comprising:

receiving a first connection request from the wireless device;

communicating with a subscriber server coupled to the processing node for determining that the wireless device is not registered with the subscriber server; and transmitting a unique evolved packet system mobility management (EMM) code, the unique EMM code comprising an instruction to the wireless device to permanently disable subsequent connection requests from the wireless device, wherein permanently disabling subsequent connection requests permanently disables a cellular radio of the wireless device, and wherein the wireless device can only utilize a Wi-Fi radio subsequent to permanently disabling the cellular radio.

* * * * *